(12) United States Patent
Bell et al.

(10) Patent No.: US 8,779,927 B2
(45) Date of Patent: Jul. 15, 2014

(54) POWER OUTAGE NOTIFICATION

(75) Inventors: Ray Bell, Mill Valley, CA (US); Will Bell, Mill Valley, CA (US); Stephen Street, San Francisco, CA (US); Ramprasad Golla, San Jose, CA (US)

(73) Assignee: Grid Net, Inc., San Francisco, CA (US)

( * ) Notice: Subject to any disclaimer, the term of this patent is extended or adjusted under 35 U.S.C. 154(b) by 189 days.

(21) Appl. No.: 13/227,354

(22) Filed: Sep. 7, 2011

(65) Prior Publication Data

US 2012/0146799 A1    Jun. 14, 2012

Related U.S. Application Data

(60) Provisional application No. 61/380,654, filed on Sep. 7, 2010.

(51) Int. Cl.
   *G08B 21/00*    (2006.01)
(52) U.S. Cl.
   USPC .................................. 340/635; 340/636.12
(58) Field of Classification Search
   USPC .......................................................... 340/635
   See application file for complete search history.

(56) References Cited

U.S. PATENT DOCUMENTS

| | | | |
|---|---|---|---|
| 6,297,734 B1 * | 10/2001 | Richardson et al. ..... | 340/539.26 |
| 6,509,841 B1 | 1/2003 | Colton et al. | |
| 6,771,058 B2 | 8/2004 | Lapinksi et al. | |
| 6,795,707 B2 | 9/2004 | Martin et al. | |
| 6,859,831 B1 | 2/2005 | Gelvin et al. | |
| 6,980,540 B1 * | 12/2005 | Laroia et al. ................. | 370/345 |
| 7,379,456 B2 | 5/2008 | Muranaka et al. | |
| 2002/0115447 A1 | 8/2002 | Martin et al. | |
| 2003/0177389 A1 | 9/2003 | Albert et al. | |
| 2004/0133314 A1 | 7/2004 | Ehlers et al. | |
| 2005/0066033 A1 | 3/2005 | Cheston et al. | |
| 2007/0038563 A1 | 2/2007 | Ryzerski | |
| 2007/0257813 A1 | 11/2007 | Vaswani et al. | |
| 2008/0074285 A1 | 3/2008 | Guthrie | |
| 2008/0127210 A1 | 5/2008 | Bosold et al. | |
| 2008/0177678 A1 | 7/2008 | Di Martini et al. | |
| 2008/0183339 A1 * | 7/2008 | Vaswani et al. ............... | 700/297 |

(Continued)

FOREIGN PATENT DOCUMENTS

JP    08-172719 A    7/1995
JP    2001-264367 A    9/2001

(Continued)

OTHER PUBLICATIONS

International Search Report & Written Opinion dated Aug. 29, 2012 for PCT Application No. PCT/US2012/020096.

(Continued)

*Primary Examiner* — Kerri McNally
(74) *Attorney, Agent, or Firm* — Goodwin Procter LLP

(57) ABSTRACT

Determining the scope of power outage includes receiving a message indicating power outage from a device, and probing other devices associated with the device sending the message. The message indicating power outage may include a power outage code, and may be received via a control channel of a communication network. This Abstract is provided for the sole purpose of complying with the Abstract requirement rules that allow a reader to quickly ascertain the subject matter of the disclosure contained herein. This Abstract is submitted with the explicit understanding that it will not be used to interpret or to limit the scope or the meaning of the claims.

14 Claims, 5 Drawing Sheets

(56) References Cited

U.S. PATENT DOCUMENTS

| | | | |
|---|---|---|---|
| 2008/0219186 A1* | 9/2008 | Bell et al. | 370/254 |
| 2008/0313006 A1 | 12/2008 | Witter et al. | |
| 2009/0240449 A1 | 9/2009 | Gibala et al. | |
| 2010/0008218 A1* | 1/2010 | Dumov et al. | 370/216 |
| 2010/0060259 A1* | 3/2010 | Vaswani et al. | 324/86 |
| 2010/0241848 A1 | 9/2010 | Smith et al. | |
| 2010/0306533 A1 | 12/2010 | Phatak | |

FOREIGN PATENT DOCUMENTS

| | | |
|---|---|---|
| JP | 2003084018 | 3/2003 |
| JP | 200423966 | 1/2004 |
| JP | 2005341646 | 12/2005 |
| JP | 2006164171 | 6/2006 |

OTHER PUBLICATIONS

Author Unknown, IEC 61850-7-1, Communication Networks and Systems in Substations, Part 7-1: Basic Communications Structure for Substation and Feeder Equipment—Principles and Models, Draft FDIS-R2-04, Nov. 4, 2002, pp. 1-111.

Author Unknown, IEEE P1615/D11, Draft Recommendation Practice for Network Communication in Electrical Power Substations, Nov. 2006, pp. 1-86.

Author Unknown, The Integrated Energy and Communication System Architecture: vol. 2, Appendix D, 2004, pp. 1-50, May 2004.

Author Unknown, The Integrated Energy and Communication System Architecture: vol. IV, 2004, pp. 1-218, May 2004.

Author Unknown, The Integrated Energy and Communication System Architecture: vol. IV, Appendix A: Security, 2004, pp. 1-168, May 2004.

Chaves et al. Recommended Framework for the Business Case Analysis of Advanced Metering Infrastructure, Apr. 14, 2004, pp. 1-36.

International Preliminary Report on Patentability dated Sep. 8, 2009 for PCT Application No. PCT/US08/55933.

International Search Report dated Jun. 30, 2008 for PCT Application No. PCT/US08/55933.

Mander et al, Communication Security Architecture for Smart Distribution System Operations, IEEE Canada Electrical Power Conference 2007, Oct. 26, 2007, pp. 411-416.

Mander et al. Data Object Based Security for DNP3 Over TCP/IP for Increased Utility Commercial Aspects Security, IEEE Power Engineering Society General Meeting Jun. 28, 2007, pp. 1-8.

Mander et al, Mechanism of Unlimited WAN Expansion for Networks in Power Distribution Systems, IEEE Conference on Large Engineering Systems in Power Engineering, Jul. 2006, pp. 72-76.

Mander et al, New Routing Mechanism of Enabling DNP3 for Smart Distribution System Collaborative Computing, IEEE Canada Electrical Power Conference, Oct. 2007, pp. 189-194.

International Search Report & Written Opinion dated Feb. 28, 2012 for PCT Application No. PCT/US2011/050722.

English Abstract for Japanese No. JP-2001-264367-A.

English Abstract for Japanese No. JP-08-172719-A.

International Preliminary Report on Patentability dated Jul. 18, 2013 for PCT Application No. PCT/US2012/020096.

* cited by examiner

POWER OUTAGE NOTIFICATION

CROSS-REFERENCE TO RELATED APPLICATIONS

This application claims priority to and the benefit of U.S. provisional application Ser. No. 61/380,654, filed Sep. 7, 2010, the disclosure of which is incorporated herein by reference in its entirety.

FIELD OF THE INVENTION

The present invention generally concerns electrical power-outage-notification systems, and in particular to systems, methods, and devices for power-outage notifications via a network, and analysis of the received notifications.

BACKGROUND

In case of a power outage, quick restoration of the power is highly desirable to the residential and commercial customers. Some power outages are limited to a single home or building, while others affect an entire neighborhood. Some outages may even span large sections of a town or more than one towns. For the restoration effect to commence as soon as possible, the utility company supplying electricity to the affected customer must be notified immediately after the loss of power. In addition, if the utility company is aware of the scope of the outage it can efficiently allocate the resources such as service personnel and/or equipment needed for a timely restoration.

Often, however, the notification of the power outage is provided by the customer, e.g., by a phone call to the utility's service center. Some customers may call within a few minutes; others may wait for several minutes or up to one or two hours before notifying; and some customers may not call the utility company at all. Thus, the utility company may not become aware of a power outage substantially in real time. Moreover, because all affected customers in a certain geographic area may not provide notification, the utility company may also not become aware of the geographic scope of the outage until the utility's service personnel reach a location where the outage occurred.

Some modern devices, such as a smart electricity meter, can automatically send an application-level message indicating a loss of power to the utility company, via a communication network, immediately (e.g., within a few seconds) after detecting the loss of power. Circuitry required for the transmission of the message typically receives power from a supply capacitor in the meter that retains charge for a few milliseconds after the power is lost. Thus, the utility company can potentially receive notifications from all affected customers within a few seconds after the power outage. However, sending an application message can take up to a few seconds, and the smart meter may not remain operational for a duration that long as the charge of the supply capacitor dissipates. Therefore, the messages from some smart meters may not be delivered to the utility company, and, as described above, the utility company may not be informed of the scope of the outage. Therefore there exists a need for improved systems and methods for power-outage notification and analysis.

SUMMARY OF THE INVENTION

In various embodiments, the present invention facilitates automatic notification of power outage via a communication network, and determination of the geographic scope of the outage based on an analysis of the received notifications. To this end, an electrical feeder associated with an outage reporting device is determined. Then, other devices in communication with the feeder that are capable of reporting power outage but did not report such an outage are identified. These non-reporting devices may be polled to determine whether they have also experienced a loss of power. Because the non-reporting devices in communication with a feeder are usually within a certain geographic area near the location of the reporting device, the scope of the outage can be determined from the above analysis.

Unlike some existing systems, the reporting device may send a control signal with a code indicating power outage over a control channel of the communication network. The control signals may be prioritized by the network and may be delivered sooner than the application messages, e.g., within a few milliseconds or a few hundred milliseconds. Therefore, the reporting device is usually more likely to be able to send the coded control signal before the device's capacitor loses power, thereby increasing the likelihood that the outage reported by the device to the utility company.

Accordingly, in one aspect a method and in another aspect a system are provided for detecting power outage. The system may be a computer-implemented system that includes a processor that executes instructions. The system further includes machine-readable storage media having the instructions stored therein, the instructions when executed by the computer system causing the computer system to implement a power outage detection procedure. The method and system include receiving a message indicating a loss of power at a device. The method and system further includes determining a feeder, i.e., a component of electricity-distribution system associated with the device, and evaluating the messages received from a first plurality of devices connected to the feeder. The method and system also includes probing a second plurality of devices connected to the feeder, wherein a message indicating power loss has not been received from any device in the second plurality of devices, and determining a power outage of the device.

In some embodiments, the message received is a control message, and the control message may be a session management message. The device may be a smart meter, router, or any sensor device on a smart grid. In some embodiments, the method and system further include notifying the detected power loss by the device to an outage management system. The power loss by one or more of the first plurality of devices, and/or one or more of the second plurality of devices may also be determined. In some embodiments, the method and system include pausing for a predetermined period of time, prior to the probing, to allow for restoration of communications, so as to avoid or mitigate false detection of power loss.

In another aspect, a device is provided for reporting power outage. The device includes a power-monitoring module for sensing a loss of power monitored by the device, and a communication module for communicating the loss of power. The communication is established, e.g., with an outage management system of a utility company, via a communication network using a control signal associated with the communication network. The control signal includes a power-outage code. The power-monitoring module may include a metrology engine for measuring consumption of power by one or more appliances in communication with the device. The communication module may include a communication processor for generating the control signal that includes the power-outage code, and communication firmware for transmitting the control message via the control channel.

In another aspect, a method for reporting power outage includes monitoring and sensing a loss of power by a power-monitoring module, and communicating the loss of power via a communication network using a control signal associated with the communication network. The control signal includes a power-outage code. In some embodiments, the method also includes measuring consumption of power by one or more appliances in communication with the power-monitoring module, and transmitting the measured power consumption via the communication network.

The communicating the loss of power may include generating the control signal that includes the power-outage code, and transmitting the control message via a control channel of the communication network. The transmitting the control message may include requesting a control channel from the communication network, and, receiving, in response, a control channel allocation from the network. The control signal may be transmitted via the allocated control channel. In some embodiments, the requesting the control channel is repeated at least once, e.g., until the channel is allocated. The communicating may be initiated after a randomly selected time interval after the sensing the loss of power so as to increase the likelihood that the requests from several channels do not result in a collision.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention. In the following description, various embodiments of the present invention are described with reference to the following drawings, in which.

DETAILED DESCRIPTION OF THE PREFERRED EMBODIMENTS

Before turning to the figures which illustrate the exemplary embodiments in detail, it should be understood that the disclosure is not limited to the details or methodology set forth in the description or illustrated in the figures. It should also be understood that the terminology is for the purpose of description only and should not be regarded as limiting.

Figure 1:
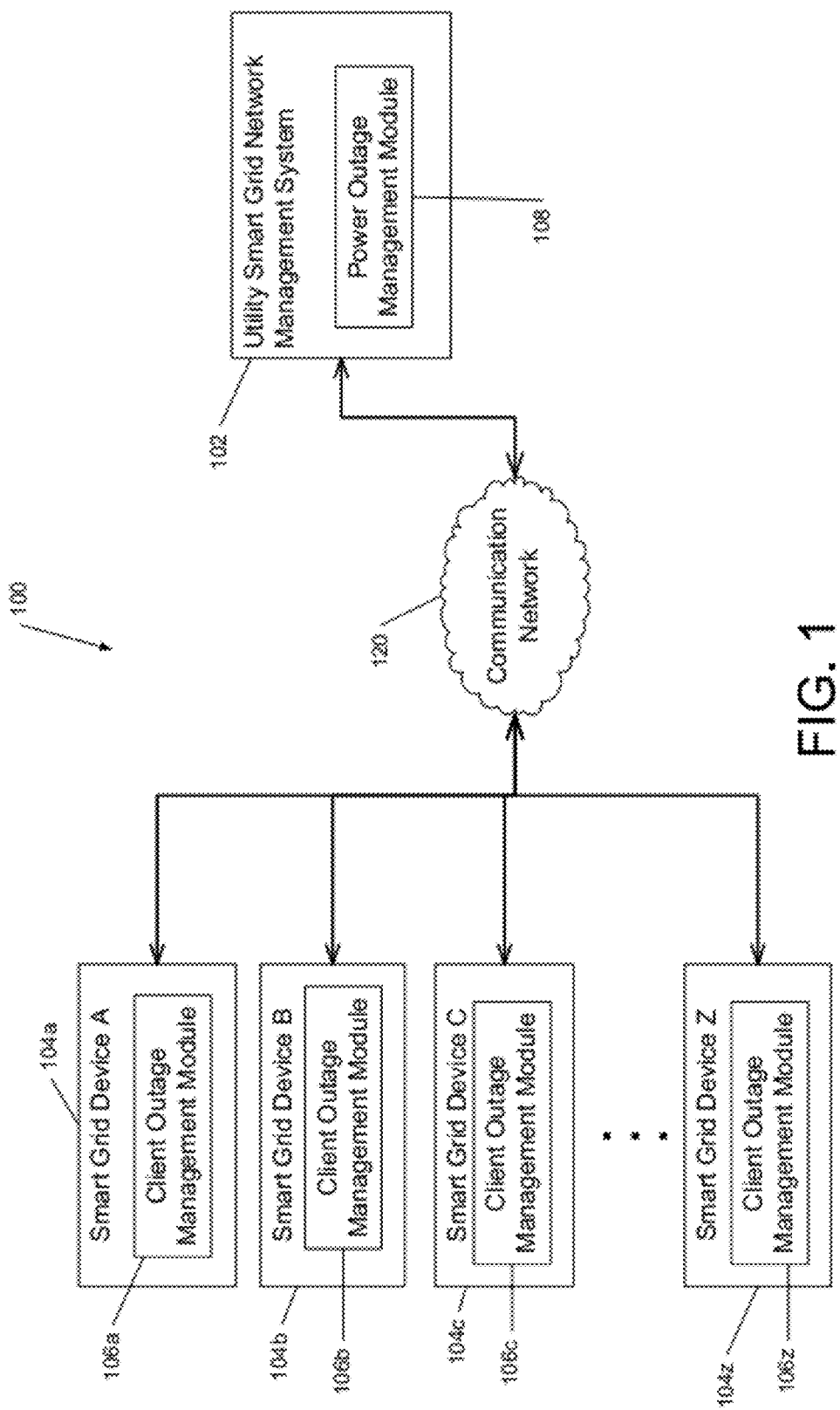
FIG. 1 schematically depicts a smart grid infrastructure according to some provided embodiments.

FIG. 1 illustrates an exemplary digital smart-grid infrastructure 100 including a utility smart-grid network-management system 102, and smart-grid devices A through Z, 104a-104z. The smart-grid device 104a may include devices such as a smart meter, a smart router, any sensor device on a smart grid, etc. Although not shown, the smart-grid infrastructure 100 may include distributed power-generation sources, energy-storage devices, smart SCADA devices, etc. For example, an electric-utility company may operate the exemplary digital smart-grid infrastructure 100. The electric-utility company may use the utility smart-grid network-management system 102 to manage deployment and operation of the smart grid including smart-grid devices 104a-104z.

The digital smart-grid infrastructure 100 also includes a communication network 120 (e.g., Worldwide Interoperability for Microwave Access (WiMAX) network, internet protocol (IP) network, a local area network (LAN), wireless local area network (WLAN), internet, etc.). Although FIG. 1 illustrates a single communication network 120, the infrastructure 100 can include more than one communication networks. Each of these communication networks can be configured in one or more ways. Examples of such networks include more than one interconnected local area networks (LANs), more than one interconnected wide area networks (WANs), interconnected LANs and WANs, etc.

In some embodiments, one or more of the smart-grid devices 104a-104z include smart meters that record consumer electricity consumption, i.e., the consumption of electricity by one or more appliances in communication with the corresponding smart-grid device, e.g., the device 104a. The smart meters/devices 104a-104z may communicate, via the communication network 120, the measured or recorded power-consumption levels back to the utility smart-grid network-management system 102 or another central system for electricity-consumption management and billing. The smart meters/devices 104a-104z may also communicate a power outage to the utility smart-grid network-management system 102. The smart grid-devices 104a-104z may communicate with the utility smart-grid network-management system 102 on a scheduled or an ad hoc basis. The smart-grid network-management system 102 may also securely communicate, via the communication network 120, with the smart-grid devices 104a-104z, e.g., regarding consumer power consumption, power outages, etc.

FIG. 1 schematically shows that the smart-grid devices 104a-104z include client outage-management modules 106a-106z. A client outage-management module 106a can detect a power outage corresponding to the smart-grid device 104a, and can send a power-down notification to the smart-grid network-management system 102 or another central system. For example, the smart-grid device 104a may send a power-down message (e.g., WiMAX message over the air) to the utility smart-grid network-management system 102 after power is lost. The power required to create and send such a message may be obtained from the power supply capacitor of the smart-grid device 104a. Such a capacitor typically retains power for a period of time (e.g., few milliseconds, a few hundred milliseconds, etc.) after the loss of power. Because the power is usually retained for only a relatively short time (e.g., a few milliseconds), the smart-grid device 104a may not be able to synthesize and transmit an application-level message. Therefore, in some embodiments, the message generated and sent by the smart-grid device 104a is a session-management message, i.e., a control message or signal associated with the communication network 120. Such a signal/message includes a power-down termination code, and, unlike an application-level message, can be sent within a few milliseconds or few hundred milliseconds, before the power retained by the power-supply capacitor is lost.

In some embodiments, consumers may be provided with a smart-grid-device interface (e.g., a user interface for a smart meter) to manage the smart-grid device. For example, the user interface may include a web page that displays to the user the power-consumption levels, power-outage information, and/or enables the user to customize power consumption (e.g., to use less electricity during peak periods).

The utility smart-grid network-management system 102 may enable a utility company to react quickly and accurately to power supply and distribution problems. As illustrated in FIG. 1, the utility smart-grid network-management system 102 includes a power-outage-management module 108. In some embodiments, the power-outage-management module 108 receives a power-down message from a smart-grid device, e.g., the device 104a. The power-outage-management module 108 may use the received messages and/or other collected information about the state of the infrastructure 100 to differentiate between problems that are due to networking issues and those that are due to power outages. The power-outage-management module 108 may determine the scale of the power outage in real-time or in near real-time, as explained in detail below with reference to FIG. 5. For example, the power-outage-management module 102 may differentiate situations such as an overall outage, an outage in a specific neighborhood or a certain transformer, or an outage that affects only a certain residential customer. In some embodiments, the power-outage-management module 108 may notify another utility system (e.g., utility outage-management system) of the detected power outage. In turn, another utility system may notify a field-operations department to dispatch crews to the precise location of the problem so that the problem can be resolved quickly and efficiently.

Although the utility smart-grid network-management system 102 is shown to include the power-outage-management module 108, the utility smart-grid network-management system 102 may include other modules (e.g., security-management module, network-management module, policy-management module, etc.) for managing the smart-grid infrastructure 100 and the various smart-grid devices 104a-104z.

Although not shown, the utility smart-grid network-management system may include one or more storage devices for storing smart-grid network related data including data regarding the smart-grid devices, power-outages data, etc. The storage device can include, for example, long-term storage (e.g., a hard drive, a tape storage device, flash memory, etc.), short-term storage (e.g., a random access memory, a graphics memory, etc.), and/or any other type of computer-readable storage. The storage device may include secure storage for storing encryption key information and other sensitive information.

It should be understood that the smart-grid devices 104a-104z can include, for example, other modules, devices, and/or processors known in the art. For example, the smart-grid devices may include modules for security management, consumption management, network management, etc. The modules and/or devices can be hardware and/or software. The modules in the smart-grid device can, for example, utilize a processor to execute computer-executable instructions and/or include a processor to execute computer-executable instructions (e.g., an encryption-processing unit, a field programmable gate array processing unit, etc.). The smart-grid devices may include one or more storage devices (not shown) for storing information associated with the smart-grid devices. The storage devices can include, for example, long-term storage (e.g., a hard drive, a tape storage device, flash memory, etc.), short-term storage (e.g., a random access memory, a graphics memory, etc.), and/or any other type of computer-readable storage.

Although FIG. 1 illustrates the smart-grid devices 104a-104z, the smart-grid infrastructure 100 can include any number of smart-grid devices. Although FIG. 1 illustrates the utility smart-grid network-management system, the smart-grid infrastructure 100 can include other central control systems for controlling and managing the network and resources on the network such as the smart-grid devices.

Figure 2:
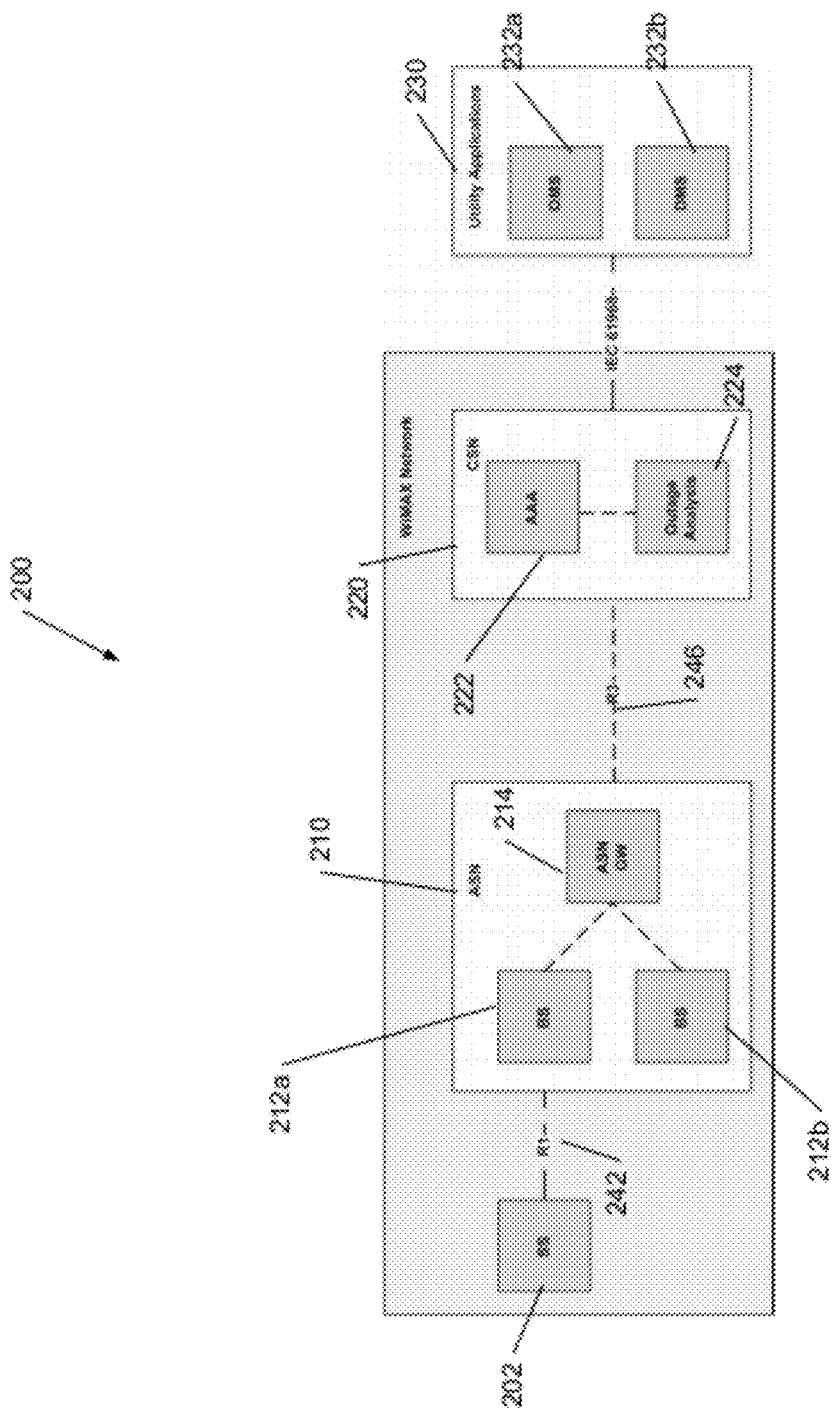
FIG. 2 illustrates architecture of a communication network used in power-outage detection according to some provided embodiments.

FIG. 2 illustrates an exemplary smart grid network architecture 200 for the communication network 120 depicted in FIG. 1. The network architecture 200 is Worldwide Interoperability for Microwave Access ("WiMAX"). The exemplary smart grid network architecture 200 is based on open-standard Radio Access Networks ("RAN") and Access Service Networks ("ASN"). In some embodiments, the exemplary smart grid network architecture 200 leverages session-management aspects of the RAN and ASN, i.e., the control messages in the architecture 200 are used, to advantageously increase the accuracy of service/power-outage information. This is because the session-management/control messages are typically communicated in less time (e.g., a few milliseconds or a few hundred milliseconds) than it would take to communicate an application message. It should be understood that the use of the session-management messages of WiMAX is for illustrative purposes only, and that similar concepts and/or network elements (i.e., control messages, and communication thereof) would apply to other Wireless and/or Wired broadband architectures. For example, the session-management capabilities of any underlying network may be leveraged for power-outage detection. A session-management message may be configured to indicate the power-down termination condition by including a value or a code indicating power down or loss of power.

As shown schematically in FIG. 2, the exemplary smart grid network architecture 200 includes a subscriber station ("SS") 202, an Access Service Network ("ASN") 210, a Connectivity Service Network ("CSN") 220, and utility applications 230. The SS 202 may include a generalized stationary equipment set providing connectivity between subscriber equipment (e.g., smart grid device such as 102a shown in FIG. 1) and a base station ("BS") 212a included in the ASN 210. The SS 202 can also be a host or support multiple hosts, each host corresponding to a smart-grid device 102a.

The ASN 210 may include a complete set of network functions needed to provide radio access to a WiMAX subscriber, such as a smart-grid device 102a included in the SS 202. The ASN 210 includes two base stations ("BS") 212a, 212b connected to an ASN Gateway ("ASN-GW") 214. The ASN 210 may provide some or all of the following functions: Layer-2 (L2) connectivity with a mobile station ("MS"), transfer of authentication, authorization and session accounting ("AAA") messages to the subscriber's Home Network Service Provider (H-NSP) for authentication, authorization, and session accounting for subscriber sessions, network discovery and selection of the subscriber's preferred NSP, relay functionality for establishing Layer-3 (L3) connectivity with a mobile station ("MS") (i.e. IP address allocation), and radio resource management. In some embodiments, for a portable and mobile environment, the ASN 210 may support some or all of the following functions: ASN anchored mobility, CSN anchored mobility, paging, ASN-CSN tunneling.

As illustrated, the ASN 210 includes network elements such as one or more Base Station(s) 212a, 212b, and one or more ASN Gateway(s) 214. The ASN 210 may be shared by more than one Connectivity Service Networks 220.

The ASN 210 may include all functional entities required to provide access services that enable communication between a smart grid device 102a included in the SS 202 and the utility applications 230. In some embodiments, within the ASN 210, a single BS 212a may be logically connected to more than one ASN-GWs for different mobile stations MSs, or subscriber stations. For a given MS/SS 202, a BS 212a may be connected to a single ASN-GW 214.

The BS 212a, 212b typically hosts one or more access functions. The BS 212a, 212b incorporates scheduler functions for uplink and downlink resources. Connectivity of a single BS 212a, 212b to more than one ASN-GW 214, as described above, may be used for load balancing or redundancy, thus facilitating a robust communication between the SS 202 and the utility applications 230. The BSs 212a, 212b are logical entities and one physical implementation of a BS may include multiple logical BSs 212a, 212b.

The ASN 210 also includes an ASN-GW 214. The ASN-GW 214 is a logical entity that may include an aggregation of Control Plane functional entities that are either paired with a corresponding function in the ASN 210 (e.g., with a BS 212a or 212b), a resident function in the CSN 220 or a function in another ASN. The ASN-GW 214 may also perform Bearer Plane routing or a bridging function.

FIG. 2 also schematically shows interoperability reference points R1 and R3. A reference point ("RP") may be a conceptual point between two groups of functions that reside in different functional entities. These functions may expose various protocols associated with a reference point. All protocols associated with a reference point may not always terminate in the same functional entity i.e., two protocols associated with a reference point may originate and terminate in different functional entities. The ASN 210 shares the RP R1 with the SS 202, which can be a mobile station ("MS"), or may include a smart-grid device 102a, as described above. The RP R3 is shared with the CSN 220 and another reference point with a different ASN-GW. The ASN 210 includes at least one BS 202 and at least one ASN-GW 214.

In some embodiments, reference point R1 includes the protocols and procedures between an MS, or a SS 202 including a smart grid device 102a and the BS 212a of the ASN 210 according to the air interface (e.g., PRY, MAC) specifications, e.g., according to the WiMAX Forum Mobile System Profile. The reference point R1 may include additional protocols related to the management plane.

Another reference point R2 (not shown) may include protocols and procedures between an MS or a SS including a smart-grid device 102a and the CSN 220 associated with Authentication, Services Authorization, and IP Host Configuration management. This reference point is a logical entity in that it does not represent a direct protocol interface between the MS/SS and CSN 220. The authentication part of reference point R2 may be run between the MS/CC and the CSN 220 operated by the home NSP. In some embodiments, the ASN and CSN operated by the visited NSP may partially process the aforementioned procedures and mechanisms. The reference point R2 might support IP Host Configuration Management running between the MS/SS and the CSN that may be operated, in part, by the home NSP and/or the visited NSP.

The reference point R3 may include the set of control protocols between the ASN 210 and the CSN 220 to support AAA, policy enforcement, and mobility management capabilities. It also encompasses the data path methods (e.g., tunneling) for transferring user data between the ASN 210 and the CSN 220.

The CSN 220 is schematically shown to include an Authentication, Authorization, and Accounting ("AAA") server 232. AAA refers to a framework (e.g., based on IETF protocols such as RADIUS or Diameter) that specifies the protocols and procedures for authentication, authorization, and accounting associated with the user, MS/SS 202, and subscribed services across different access technologies. For example, AAA may include mechanisms for secure exchange and distribution of authentication credentials and session keys for data encryption.

FIG. 2 schematically shows that the CSN 220 further includes Outage-Analysis module 224. In some embodiments, the outage analysis is performed by the power-outage-management module of the utility smart-grid network-management system 230. Once a power-down message originated by the smart-grid device reaches the utility smart grid network system 230, as described below with reference to FIG. 3, the power-outage-management module performs analysis as described below with reference to FIG. 5. Based on this analysis the scope of the power outage, e.g., whether a single or multiple smart-grid devices have lost power, can be determined.

A session in a network (such as that described with reference to FIG. 2) may refer to link-layer, IP-layer, or, higher layer connectivity established between one or more MS/SS and a network element (e.g., a BS) in order to exchange link-level frames or packets. A session may have certain well-defined properties associated with it such as traffic characteristics (e.g., traffic type, policy, encryption), mobility support (e.g., re-authentication, re-keying, routing), and robustness (e.g., state management, persistence). Session management may refer to the set of procedures implemented in the MS/SS and the network that support all such properties associated with an active session.

In some embodiments, in a WiMAX/4G network, the specific session management features include the air interface location update and AAA accounting events according to IEEE 802.16e standards. Typically, in a WiMAX network, a mobile station MS (e.g., a cell phone, a BlackBerry, etc.) performs idle mode location update during which it may send a power down signal. The power-down signal is sent when a user of the MS shuts it off, and the processing of the power down signal can enable efficient use of the network resources. The idle mode location update is generally performed when one of the pre-specified conditions occur, or at will by the MS.

In some embodiments, the idle mode location update control message for power-down update provides a deterministic method for detecting a power down. For example, the message may include a code indicating how the session is terminated. The code may include values such as power down, user request, lost carrier, etc. When the code contains a value indicating power down, the power-outage-management module can recognize that a smart-grid device originating this message lost power, as described below with reference to FIG. 3.

Figure 3:
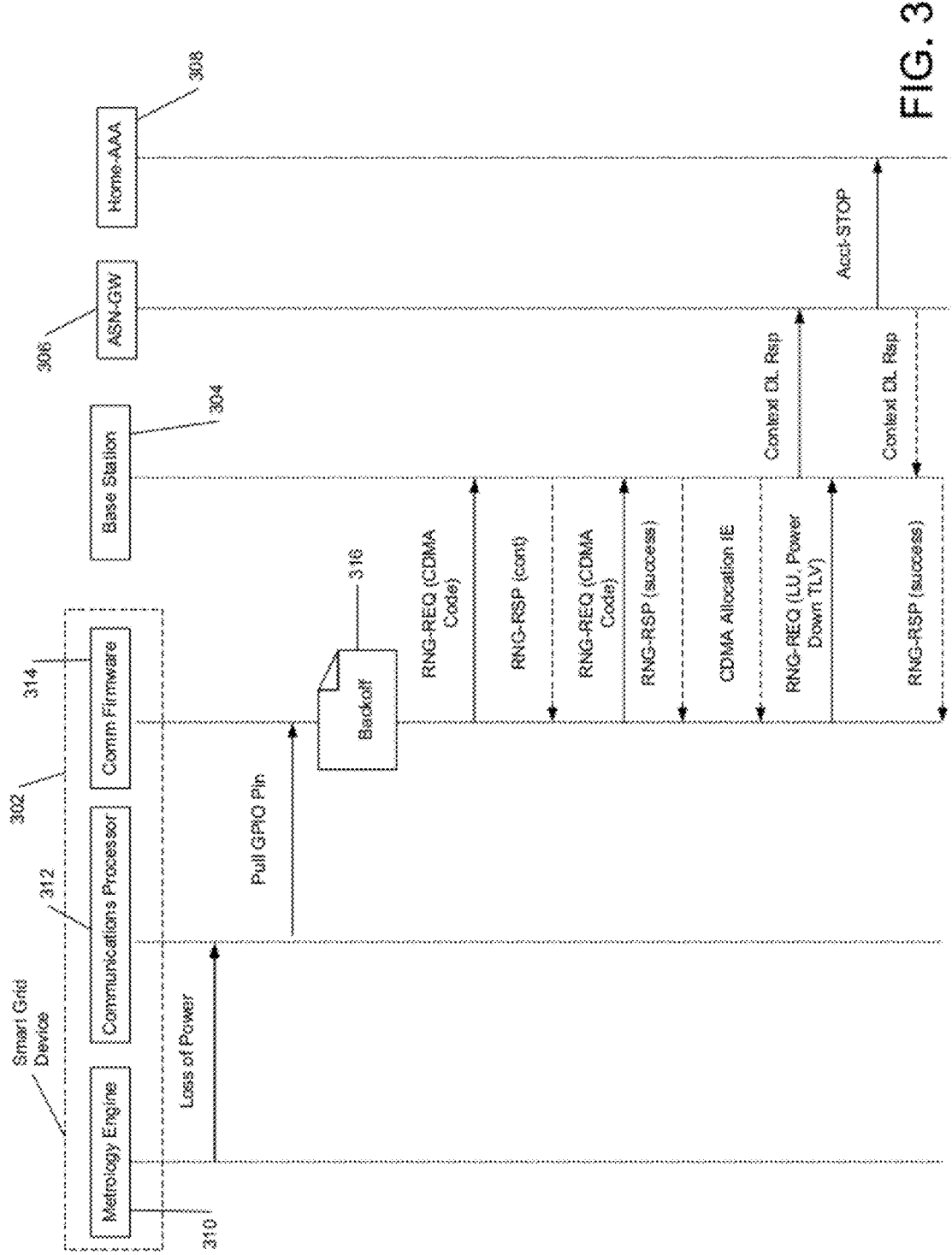
FIG. 3 illustrates transmission of a message indicating power outage, via a network having an architecture illustrated in FIG. 2, according to some provided embodiments.

FIG. 3 illustrates transmission of an exemplary power-down message from a smart-grid device 302 to an AAA server 308. The smart-grid device 302 includes a metrology engine 310, a communications processor 312, and communications firmware 314. It should be understood that these components are illustrative only, and are logical entities. Therefore, one or more circuits including a processor and memory can implement the functionalities provided by the components 312-314.

In some embodiments, the smart-grid device 302 may perform an operation to trigger session termination. The smart-grid device 302 may trigger an idle mode location update operation, a control procedure initiated by a mobile station, when the smart-grid device detects power outage. Specifically, the metrology engine 310 may detect a loss of power, and, in response, the communications processor 312 can synthesize a session management or control message (e.g., an LU message). The control signal includes a power-outage code. The communications processor 312 and the communications firmware 314 send the control message including the power-outage code to a base station 304. A backoff 316 may be performed before the firmware 314 initiates communication of the control message, as explained below.

The firmware 314 initiates communication with the BS 304 by requesting a session management/control channel from the network (e.g., the network described with reference to FIG. 2), for example, by sending a "RNG-REQ (CDMA Code)" signal. A control channel may not be immediately allocated to the smart-grid device 302, and, hence, the firmware 314 may receive a "RNG-RSP (cont)" message from the network. The firmware 314 may repeat the above process until a channel is allocated. Once the channel is allocated, the firmware 314 receives a "RNG-RSP (success)" signal and the channel allocation, i.e., "CDMA allocation BS" to establish communication with the BS 304. Then, the firmware 314 sends to the BS 304 the synthesized control message "RNG-REQ" with the code "Power Down TLV" indicating that the smart grid device 302 has detected a loss of power. The control message including the power-down code can be sent within a few milliseconds or a few hundred milliseconds after the loss of power is detected by the metrology engine 310. In some instances, however, the supply capacitor of the smart grid device may lose the stored charge before a control channel is allocated or acquired, or before the control message is transmitted.

The BS 304 communicates this message to the ASN-GW 306 which, in turn, transmits an accounting stop message indicating power failure to the AAA client/server 308. An AAA accounting client may notify the power outage communicated by the smart-grid device 302 (which may be associated with a SS as shown in FIG. 2) to an AAA accounting server. For example, the notification of session termination is implemented by the accounting client sending the accounting server an accounting request record with an accounting status type having value "STOP." In this example, the STOP record may include a RADIUS Attribute 49, "Acct-Terminate-Cause," to indicate how the session was terminated. The "Acct-Terminate-Cause" may be based on the power-outage code transmitted by the smart-grid device 302. In other examples, other fields may be used by incorporating the power-outage code therein, to indicate that a session was terminated due to a power outage.

If power outage is simultaneously experienced by a number of smart-grid devices in a certain geographic locality, many smart-grid devices may simultaneously or nearly simultaneously request allocation of control channels so that each smart device can send a power-outage message. Due to several near-simultaneous requests, it is likely that only a few requests may be granted by the network, and, hence, only a few smart-grid devices would be able to notify power outage. The backoff 316 randomly delays the initiation of the channel request by the communications processor 312 and the firmware 314, e.g., by 1 milliseconds, 5 milliseconds, 14 milliseconds, etc. This increases the likelihood that several smart-grid devices do not simultaneously compete for the network-control channels, and, hence, several smart-grid devices may be able receive the requested channel allocation, and thus be able to notify power outage.

Figure 4:
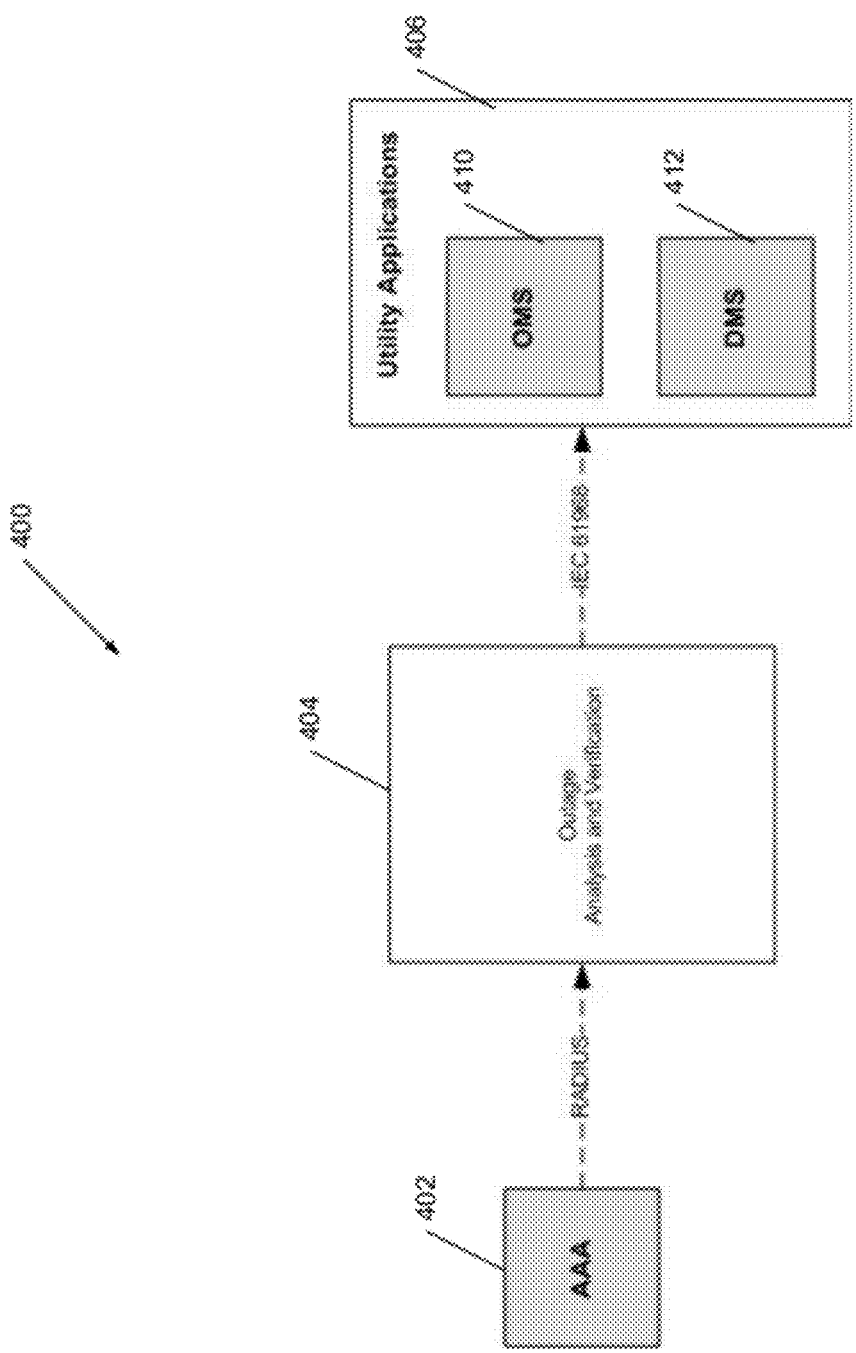
FIG. 4 schematically depicts processing of the message indicating power outage according to some provided embodiments.

FIG. 4 illustrates the AAA server 402 transmitting a message to the Outage Analysis and Verification logic 404. In some embodiments, the power-outage-management module 410 of the utility smart grid network-management system 406 performs the outage analysis and verification. While isolated service-level outages may be reliably notified, outages resulting from transformer outages or higher level outages, may result in simultaneous or near simultaneous generation of power-outage messages from several smart grid devices. This may cause collisions as the large number of SSs compete for a shared control channel in the communication network (e.g., WiMAX network), even when a backoff mechanism as described above is provided. This may prevent all the notifications from being received by the AAA server 402 before the capacitor on smart-grid device is consumed.

Figure 5:
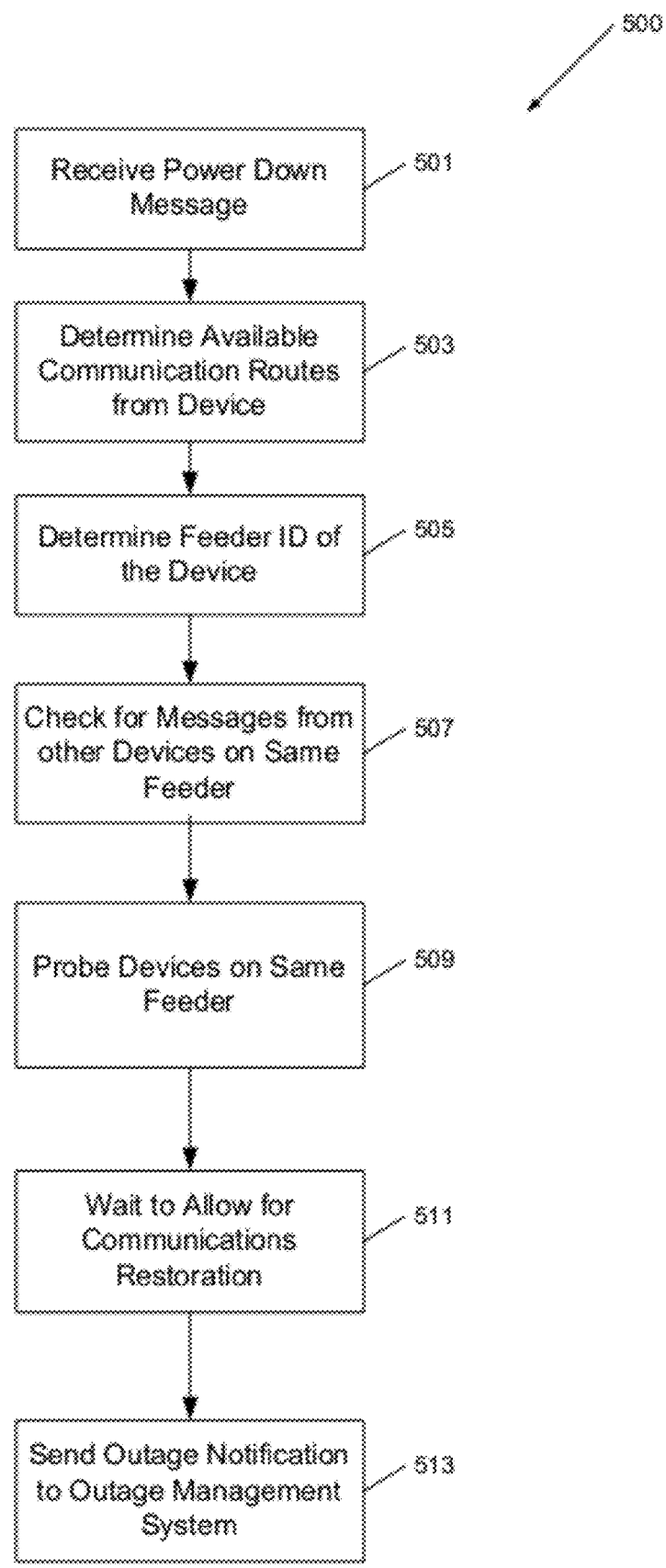
FIG. 5 illustrates a process of determining the scope of the power outage according to some provided embodiments.

As illustrated with reference to FIG. 5, the power-outage-management module can increase the likelihood of the identification of all smart-grid devices that have detected a power loss. As described above, the backoff procedure that may be implemented at a subscriber station (or at a smart-grid device at the subscriber station), advantageously minimizes the collisions and increases the number of messages being received at the power-outage-management module. e.g., an AMI head-end. In some embodiments, the utility smart grid network-management system may page or ping the smart-grid devices (e.g., periodically) to improve the outage analysis. In other embodiments, the power-outage-management module may utilize the distribution-network topology and node status to verify power across feeder's sectionalizers and fault isolators to give the outage-management system ("OMS") stronger confidence in root-cause analysis. A feeder is a component of the electricity-distribution system that supplies power to one or more subscribers such as homes, commercial buildings, etc.

In step 501, the power-outage-management module receives a message indicating a power down at a smart-grid device. The power-outage-management module may determine if active communication routes exist between the AAA server and the smart-grid device that sent the power-down message in step 503. The power-outage-management module may then identify, in step 505, one or more smart-grid devices located in geographic proximity to the smart-grid device. For example, in step 505 the power-outage-management module may determine the electric feeder identification associated with the smart-grid device that sent the power-down message.

In step 507, the power-outage-management module may determine if other smart-grid devices on the same feeder have sent messages indicating session termination. For the smart-grid devices that have not sent session-termination messages, the power-outage-management module may perform communication probing in step 509. If a smart-grid device from which a power-outage message was not received has indeed lost power, it may not respond to the probing. On the other hand, if that smart grid device has not detected a power loss, and if its communication link is operational, it may respond to the communication probing, allowing the power-outage-management to infer that the probed smart-grid device has not lost power. A false positive power outage may be inferred if a probed smart-grid device has not detected a power loss, but did not respond to the probing due to a communication link failure. To avoid or minimize such false positives, the power-outage-management module may wait for a configurable period (e.g., a few seconds) in step 511 to allow for communications restoration, so that the smart-grid device may respond to the probing.

The power-outage-management module may also compare aggregate load on the feeder before and after the potential outage event to determine the scale of the outage. Once power outage at a certain smart-grid device or devices is confirmed, in step 513 the power-outage-management module may send an outage notification to a utility's outage-management system. The utility's outage-management system may notify a field operations department to dispatch crews to the precise location of the power outage.

In some embodiments, a network policy used by the utility smart grid network-management system may list situations when the outage notification ought to be suppressed. For example, outage notification for pre-determined feeders, pre-determined date ranges, before or after a configurable threshold of events may be suppressed.

The above-described systems and methods can be implemented in digital electronic circuitry, in computer hardware, firmware, and/or software. The implementation can be as a computer program product (i.e., a computer program tangibly embodied in an information carrier). The implementation can, for example, be in a machine-readable storage device, for execution by, or to control the operation of, data processing apparatus. The implementation can, for example, be a programmable processor, a computer, multiple computers, and/or a microcontroller.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors executing a computer program to perform the various functions by operating on input data and generating output. Method steps can also be performed by and an apparatus can be implemented as special purpose logic circuitry. The circuitry can, for example, be a FPGA (field programmable gate array) and/or an ASIC (application-specific integrated circuit). Modules, subroutines, and software agents can refer to portions of the computer program, the processor, the special circuitry, software, and/or hardware that implements that functionality.

Processors suitable for the execution of a computer program include, by way of example, both general and special purpose microprocessors, and anyone or more processors of any kind of digital computer. Generally, a processor receives instructions and data from a read-only memory or a random access memory or both. The essential elements of a computer are a processor for executing instructions and one or more memory devices for storing instructions and data. Generally, a computer can be operatively coupled to receive data from and/or transfer data to one or more mass storage devices for storing data (e.g., magnetic, magneto-optical disks, or optical disks).

Data transmission and instructions can also occur over a communications network. Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a user, the above described techniques can be implemented on a computer having a display device. The display device can, for example, be a cathode ray tube (CRT) and/or a liquid crystal display (LCD) monitor. The interaction with a user can, for example, be a display of information to the user and a keyboard and a pointing device (e.g., a mouse or a trackball) by which the user can provide input to the computer (e.g., interact with a user interface element). Other kinds of devices can be used to provide for interaction with a user. Other devices can, for example, be feedback provided to the user in any form of sensory feedback (e.g., visual feedback, auditory feedback, or tactile feedback). Input from the user can, for example, be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributing computing system that includes a front-end component. The front-end component can, for example, be a client computer having a graphical user interface, a Web browser through which a user can interact with an example implementation, and/or other graphical user interfaces for a transmitting device. The components of the system can be interconnected by any form or medium of digital data communication (e.g., a communication network). Examples of communication networks include a local area network (LAN), a wide area network (WAN), the Internet, wired networks, and/or wireless networks.

The system can include clients and servers. A client and a server are generally remote from each other and typically interact through a communication network. The relationship of client and server arises by virtue of computer programs running on the respective computers and having a client-server relationship to each other.

The communication networks can include, for example, packet-based networks and/or circuit-based networks. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks can include, for example, the public switched telephone network (PSTN), a private branch exchange (PBX), a wireless network (e.g., RAN, Bluetooth, code-division multiple access (CDMA) network, time division multiple access (TDMA) network, global system for mobile communications (GSM) network), and/or other circuit-based networks. The communication networks can include a WiMAX network.

The smart grid device can include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer) with a world wide web browser (e.g., Microsoft® Internet Explorer® available from Microsoft Corporation, Mozilla® Firefox available from Mozilla Corporation). The mobile computing device includes, for example, a personal digital assistant (PDA).

Comprise, include, and/or plural forms of each are open ended and include the listed parts and can include additional parts that are not listed. And/or is open ended and includes one or more of the listed parts and combinations of the listed parts.

As used in this application, the terms "component," "module," "system," and the like are intended to refer to a computer-related entity, either hardware, firmware, a combination of hardware and software, software, or software in execution. For example, a component can be, but is not limited to being, a process running on a processor, an integrated circuit, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Moreover, various functions described herein can be implemented in hardware, software, firmware, or any combination thereof. If implemented in software, the functions can be stored on or transmitted over as one or more instructions or code on a computer-readable medium. Computer-readable media is non-transitory in nature and includes both computer storage media and communication media including any medium that facilitates transfer of a computer program from one place to another. A storage media can be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any physical connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc (BD), where disks usually reproduce data magnetically and discs reproduce data optically with lasers. Combinations of the above should also be included within the scope of computer-readable media.

Additionally, in the subject description, the word "exemplary" is used to mean serving as an example, instance, or illustration. Any embodiment or design described herein as "exemplary" is not necessarily to be construed as preferred or advantageous over other embodiments or designs. Rather, use of the word exemplary is intended to present concepts in a concrete manner.

One skilled in the art will realize the provided embodiments may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

What is claimed is:

1. A method for detecting power outage, the method comprising:
   receiving a message from a device, the message indicating loss of power by the device;
   determining a feeder associated with the device;
   evaluating messages received from a first plurality of devices connected to the feeder;
   probing a second plurality of devices connected to the feeder, wherein a message indicating power loss has not been received from any device in the second plurality of devices;
   pausing for a predetermined period of time, prior to the probing, to allow for restoration of communications; and
   determining a power outage of the device.

2. The method of claim 1, wherein the message is a control message.

3. The method of claim 2, wherein the control message is a session termination message.

4. The method of claim 1, wherein the device is a smart meter.

5. The method of claim 1, wherein the device is a router.

6. The method of claim 1, further comprising notifying an outage-management system of power loss by the device.

7. The method of claim 1, further comprising determining power loss by one or more of the first plurality of devices.

8. The method of claim 1, further comprising determining power loss by one or more of the second plurality of devices.

9. A computer-implemented system comprising:
   a processor; and
   a non-transitory machine readable medium, the medium containing a set of processor executable instructions that, when executed by the processor configure the system to:
   receive a message from a device, the message indicating power loss by the device;
   determine a feeder associated with the device;
   evaluate messages received from a first plurality of devices connected to the feeder;
   probe a second plurality of devices connected to the feeder, wherein a message indicating power loss has not been received from any device in the second plurality of devices;
   pause for a predetermined period of time, prior to the probing, to allow for restoration of communications; and
   determine a power outage of the device.

10. The system of claim 9, wherein the device is a smart meter.

11. The system of claim 9, wherein the device is a router.

12. The system of claim 9, wherein the system is further configured to notify an outage-management system of power loss by the device.

13. The system of claim 9, wherein the system is further configured to determine power loss by one or more of the first plurality of devices.

14. The system of claim 9, wherein the system is further configured to determine power loss by one or more of the second plurality of devices.

* * * * *